United States Patent
Hayashi et al.

(10) Patent No.: US 11,130,875 B2
(45) Date of Patent: Sep. 28, 2021

(54) INKJET INK FOR CERAMIC SUBSTRATE

(71) Applicant: Noritake Co., Limited, Nagoya (JP)

(72) Inventors: Hiromichi Hayashi, Nagoya (JP); Tomoshi Kumazawa, Nagoya (JP)

(73) Assignee: Noritake Co., Limited

(*) Notice: Subject to any disclaimer, the term of this patent is extended or adjusted under 35 U.S.C. 154(b) by 0 days.

(21) Appl. No.: 16/640,948

(22) PCT Filed: Aug. 7, 2018

(86) PCT No.: PCT/JP2018/029665
§ 371 (c)(1),
(2) Date: Feb. 21, 2020

(87) PCT Pub. No.: WO2019/044429
PCT Pub. Date: Mar. 7, 2019

(65) Prior Publication Data
US 2020/0199389 A1    Jun. 25, 2020

(30) Foreign Application Priority Data
Aug. 31, 2017    (JP) .............................. JP2017-167654

(51) Int. Cl.
*C09D 11/38* (2014.01)
*B41J 11/00* (2006.01)
*B41M 5/00* (2006.01)
*C04B 41/00* (2006.01)
*C04B 41/45* (2006.01)
*C04B 41/50* (2006.01)
*C04B 41/86* (2006.01)
*C09D 11/101* (2014.01)
*C09D 11/322* (2014.01)

(52) U.S. Cl.
CPC .............. *C09D 11/38* (2013.01); *B41J 11/002* (2013.01); *B41M 5/0023* (2013.01);
(Continued)

(58) Field of Classification Search
CPC ....... C09D 11/54; C09D 11/30; C09D 11/102; C09D 11/107; C09D 11/322; C09D 11/36;
(Continued)

(56) References Cited

U.S. PATENT DOCUMENTS

| 6,357,868 B1 * | 3/2002 | Pfaff | ........................ | B41M 3/12 |
| | | | | 347/100 |
| 2002/0022133 A1 * | 2/2002 | Hayashi | .................. | C04B 41/52 |
| | | | | 428/432 |

(Continued)

FOREIGN PATENT DOCUMENTS

| EP | 1818373 | 8/2007 |
| EP | 3101072 | 12/2016 |

(Continued)

OTHER PUBLICATIONS

Umebayashi, et al.; Article entitled: "High Functionality of UV Inkjet Inks Produced by Combining an N-vinyl Compound", Fujifilm Research & Development, No. 60, Published 2015, 4 pgs.
(Continued)

*Primary Examiner* — Manish S Shah
(74) *Attorney, Agent, or Firm* — Taylor English Duma LLP (57) ABSTRACT

The present invention provides an inkjet ink for a ceramic substrate, the inkjet ink making it possible to prevent a printed layer from peeling away after firing and allowing a desired image to be better fixed on a ceramic substrate. In the inkjet ink for a ceramic substrate disclosed here, the proportion of a monofunctional monomer in a monomer component is at least 90 mass %, the volume ratio of an inorganic solid relative to the total volume of the inkjet ink is 10 vol % to 20 vol %, and the ratio of the content of an N-vinyl compound to that of the monomer component (N-vinyl compound/monomer component) in the inkjet ink is 0.05 to 0.8 in terms of mass.

17 Claims, 3 Drawing Sheets

(52) U.S. Cl.
CPC ........ *C04B 41/009* (2013.01); *C04B 41/4543* (2013.01); *C04B 41/4578* (2013.01); *C04B 41/5022* (2013.01); *C04B 41/86* (2013.01); *C09D 11/101* (2013.01); *C09D 11/322* (2013.01)

(58) Field of Classification Search
CPC ......... C09D 11/40; C09D 11/38; C09D 11/32; C09D 11/324; C09D 11/328; C09D 11/101; C09D 11/005; C09D 11/52; C09D 11/106; D06P 1/0032; D06P 1/0096; D06P 5/001; D06P 5/02; D06P 5/2011; D06P 5/2077; D06P 5/2083; D06P 5/30; B41J 3/4078; B41J 11/06; B41J 2/2117; B41J 2/2107; B41J 2202/03; B41J 2/01; B41J 2/211; B41J 2/1433; B41J 2/17; B41J 2/17593; B41J 2/1755; B41J 2/2114; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2/14201; B41J 2/045; B41J 11/0015; B41J 11/002; B41J 2/04581; B41J 2/055; B41J 2/16538; B41J 2002/16502; Y10T 428/24802; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2003/0162646 | A1* | 8/2003 | Kawamura | C04B 2103/54 501/16 |
| 2004/0029700 | A1* | 2/2004 | Kato | C03C 3/091 501/16 |
| 2007/0256455 | A1* | 11/2007 | Berden | C09D 11/037 65/66 |
| 2009/0117276 | A1 | 5/2009 | Ito | |
| 2010/0098952 | A1 | 4/2010 | Yeong et al. | |
| 2011/0008547 | A1 | 1/2011 | Grant et al. | |
| 2013/0222499 | A1* | 8/2013 | Cong | B41J 2/01 347/102 |
| 2013/0342593 | A1* | 12/2013 | Fornara | C09D 11/326 347/2 |
| 2014/0044894 | A1* | 2/2014 | Shipway | C09D 11/322 428/29 |
| 2015/0015638 | A1* | 1/2015 | Shipway | B41J 11/002 347/20 |
| 2015/0291841 | A1* | 10/2015 | Fores Fernandes | B41M 5/007 524/606 |
| 2016/0312050 | A1 | 10/2016 | Ohnishi | |
| 2017/0107388 | A1 | 4/2017 | Wang et al. | |

FOREIGN PATENT DOCUMENTS

| | | | |
|---|---|---|---|
| EP | 3101072 B1 * | 8/2019 | ........... C09D 11/322 |
| JP | 2001039008 | 2/2001 | |
| JP | 2001081363 | 3/2001 | |
| JP | 2010519154 | 6/2010 | |
| JP | 2011515250 | 5/2011 | |
| JP | 2015009387 | 1/2015 | |
| JP | 2016176084 | 10/2016 | |
| JP | 2017075251 | 4/2017 | |
| WO | 2007020779 | 2/2007 | |
| WO | 2015115600 | 8/2015 | |

OTHER PUBLICATIONS

Hiromichi; International Search Report and Written Opinion for PCT/JP2018/029665, filed Aug. 7, 2018, dated Oct. 23, 2018, 14 pgs.

Noritake Co., Limited; Search Report for Spanish patent application No. 202090006, dated Apr. 16, 2020, 8 pgs.

Noritake Co., Limited; Office Action for Spanish patent application No. 202090006, dated Sep. 23, 2020, 10 pgs.

* cited by examiner

INKJET INK FOR CERAMIC SUBSTRATE

TECHNICAL FIELD

The present invention relates to an inkjet ink used for a ceramic substrate to be fired. Moreover, the present international application claims priority on the basis of Japanese Patent Application No. 2017-167654, which was filed on 31 Aug. 2017, and all the details of that application are incorporated by reference in the present description.

BACKGROUND ART

Inkjet printing has been used in the past as a printing method for drawing a desired image, such as a pattern or letter, on a print target. This type of inkjet printing can draw high precision images using simple and inexpensive apparatuses, and is therefore used in a variety of fields. In recent years, use of such inkjet printing has been considered for drawing images on inorganic base materials such as porcelain and ceramic tiles. Specifically, handwriting, plate printing, and the like, was used in the past in order to draw patterns, letters, and the like on such ceramic base materials. However, attention has been focused on inkjet printing because skilled artisanal techniques such as handwriting are not required and, unlike plate printing, rapid on-demand printing is possible.

However, it is difficult to simply transfer inkjet printing techniques used in other fields having different print targets, such as paper and fabrics, to fields relating to inorganic base materials such as porcelain and ceramic tiles, and there is much room for improvement in inkjet printing in fields relating to inorganic base materials. For example, in the field of inorganic base materials, an inorganic base material on which an image has been drawn is sometimes subjected to a firing treatment at a temperature of 500° C. or higher (for example, 500° C. to 1200° C.). On such occasion, if an inkjet ink used for paper, fabrics, and the like (hereinafter referred to simply as an "ink" in some cases) is used, there are concerns that pigments will become discolored (or decolored) during firing. Therefore, inks containing heat-resistant pigments have been proposed for use in the field of inorganic base materials. Patent Literature 1 to 4 are given as examples of documents that disclose this type of prior art.

CITATION LIST

Patent Literature

Patent Literature 1: Japanese Translation of PCT Application No. 2011-515250
Patent Literature 2: Japanese Patent Application Publication No. 2015-9387
Patent Literature 3: Japanese Translation of PCT Application No. 2010-519154
Patent Literature 4: WO 2007/020779

SUMMARY OF INVENTION

Technical Problem

Patent Literature 1 discloses inkjet printing a composition, which contains a UV-curable monomer and an inorganic pigment, on a substrate, curing the composition, and then firing the printed composition in a step for decorating a glass or ceramic substrate. This document indicates that by being constituted in this way, the composition adheres well to the glass or ceramic substrate and the substrate can be decorated. However, if printing is carried out using an ink containing inorganic solids and a UV-curable monomer, a printed layer peels off during the initial firing stage and decoration per se can be difficult, according to findings by the inventors of the present invention.

With these circumstances in mind, the main purpose of the present invention is to provide an inkjet ink used for a ceramic substrate to be fired, in which peeling of a printed layer (a decorative part) following firing is prevented and a desired image can be better fixed on the ceramic substrate. Another purpose of the present invention is to provide a method of producing a ceramic product, by which a ceramic product having such a decorative part can be produced stably (that is, with good quality stability).

Solution to Problem

The inventors of the present invention surmised that a cause of a printed layer peeling off during the initial firing stage is that the printed layer shrinks upon irradiation with light and residual stress is present in the printed layer after curing. And the inventors attempted to find an ink in which residual stress can be reduced. As a result, the inventors found that by specifying a specific volume ratio for inorganic solids in an ink composition and using a combination of a photocurable monomer, which is constituted mainly from a monofunctional monomer, and an N-vinyl compound at a specific mass ratio, it was possible to prevent peeling of a printed layer following firing and better fix a desired image on a ceramic substrate.

That is, according to the present specification, provided is an inkjet ink used for a ceramic substrate to be fired. This ink includes an inorganic solid, a photocurable monomer component and an N-vinyl compound containing a nitrogen atom. The monomer component includes a monofunctional monomer having one functional group in a molecule thereof. The proportion of the monofunctional monomer in the monomer component is at least 90 mass %. And, the volume ratio of the inorganic solid relative to the total volume of the inkjet ink is 10 vol % to 20 vol %. In addition, the ratio of the content of the N-vinyl compound to that of the monomer component (N-vinyl compound/monomer component) in the inkjet ink is 0.05 to 0.8 in terms of mass. As described above, by specifying a specific volume ratio for an inorganic solid in an ink composition and using a combination of a photocurable monomer which is constituted mainly from a monofunctional monomer and an N-vinyl compound at a specific mass ratio as described above, it is possible to provide a ceramic product in which a printed layer is prevented from peeling away after firing and a desired image is better fixed on a ceramic substrate.

In a preferred aspect of the inkjet ink disclosed here, the inorganic solid includes an inorganic pigment and a glass. By incorporating a glass in the inkjet ink, the effect of preventing a printed layer from peeling away after firing can be more advantageously exhibited. In addition, it is possible to form a glossy colorful decorative part on a surface of a ceramic substrate.

In a preferred aspect of the inkjet ink disclosed here, the proportion of the glass in the inorganic solid is at least 20 mass %. If the proportion of the glass in the inorganic solid is such a value, advantageous effects for improving the performance mentioned above (a peeling prevention effect and a gloss improvement effect) can be more advantageously exhibited.

In a preferred aspect of the inkjet ink disclosed here, the proportion of the glass in the inorganic solid is at least 50 mass %. If the proportion of the glass in the inorganic solid is such a value, advantageous effects for improving the performance mentioned above (a peeling prevention effect and a gloss improvement effect) can be more advantageously exhibited.

In a preferred aspect of the inkjet ink disclosed here, the functional group in the monofunctional monomer is a (meth) acryloyl group. A monofunctional monomer having a (meth) acryloyl group can effectively contribute to prevention of peeling of a printed layer.

In a preferred aspect of the inkjet ink disclosed here, the monofunctional monomer has a molecular weight of 100 to 300. If the molecular weight of the monofunctional monomer falls within such a range, the inkjet ink makes it possible to more effectively fix a desired image on a ceramic substrate while inhibiting an increase in the viscosity of an ink (and thus also maintaining good printability).

Also provided by the present invention is a method of producing a ceramic product having a decorative part. The production method includes the steps for: depositing a cured product of any of the inkjet inks for a ceramic substrate disclosed here on a surface of a ceramic substrate; and firing the deposited cured product under a condition whereby a maximum firing temperature is set to fall within a range of 500° C. to 1200° C. According to this production method, a ceramic product having a decorative part that exhibits excellent durability can be stably (that is, with good production stability) produced.

DESCRIPTION OF EMBODIMENTS

Preferred embodiments of the present invention will now be explained. Moreover, matters which are essential for carrying out the invention and which are matters other than those explicitly mentioned in the present specification are matters that a person skilled in the art could understand to be matters of design on the basis of the prior art in this technical field. The present invention can be carried out on the basis of the matters disclosed in the present specification and common general technical knowledge in this technical field. Moreover, the term "ceramic" means an inorganic substance in the present specification.

<Inkjet Ink for Ceramic Substrate>

The inkjet ink disclosed here is an inkjet ink used for a ceramic substrate to be fired. This inkjet ink contains inorganic solids, a photocurable monomer component and an N-vinyl compound containing a nitrogen atom.

<Inorganic Solids>

(Inorganic Pigment)

The inorganic solids are a component that constitutes a most part of a printed layer (decorative part) after firing, and can include an inorganic pigment (which is typically particulate). The inorganic pigment may be one containing, for example, a metal compound. This type of inorganic pigment exhibits excellent heat resistance, and can therefore prevent discoloration (or decoloration) when the inorganic pigment is deposited on a ceramic substrate and subjected to a firing treatment at a temperature of 500° C. or higher (for example 500° C. to 1200° C.). Specific examples of this type of inorganic pigment include complex metal compounds containing at least one or more metallic elements selected from the group consisting of Zr, Ti, Pr, Cr, Sb, Ni, Co, Al and Cd. Of these, Zr-based complex metal oxides containing mainly Zr (for example, $ZrSiO_4$) can be used particularly advantageously from the perspective of heat resistance. For example, in ordinary inkjet printing, an image having a desired color is drawn by combining inks of three colors, namely cyan, yellow and magenta. In cases where a Zr-based complex metal oxide mentioned above is used as an inorganic pigment, it is possible to obtain inorganic pigments having the three colors mentioned above by doping the Zr-based complex metal oxide with prescribed metallic elements. For example, $ZrSiO_4$—V (vanadium) is an example of a cyan color Zr-based complex metal oxide. $ZrSiO_4$—Pr (praseodymium) is an example of a yellow color Zr-based complex metal oxide. And $ZrSiO_4$—Fe is an example of a magenta color Zr-based complex metal oxide. In addition, black inks are used in inkjet apparatuses in addition to the three colors mentioned above. For example, FeCr-based complex metal compounds (for example, spinel black) can be advantageously used as inorganic pigments able to be used in this type of black ink. Moreover, inorganic pigments used in the past can be used without particular limitation in the inorganic pigment in the present embodiment, and are not limited to the Zr-based complex metal oxides mentioned above.

The particle diameter of the inorganic pigment is preferably adjusted, as appropriate, in view of the diameter of a discharge nozzle of an inkjet apparatus described below. If the particle diameter of the inorganic pigment is too large, there are concerns that the inorganic pigment will block discharge nozzles and cause a decrease in ink discharge properties. Because the diameter of discharge nozzles in ordinary inkjet apparatuses is approximately 15 μm to 60 μm (for example, 25 μm), it is preferable to reduce the particle size of the inorganic pigment in such a way that the D100 particle diameter, which corresponds to a cumulative 100% by number from the small particle diameter side, is 5 μm or less (and preferably 1 μm or less). This D100 particle diameter can be a value measured on the basis of particle size distribution measurements carried out using a dynamic light scattering method.

The inorganic pigment may be inorganic particles mixed and dispersed in a glass that is described later. This type of inorganic particles may be, for example, metal nanoparticles. Examples of metal nanoparticles include gold nanoparticles, silver nanoparticles, copper nanoparticles, platinum nanoparticles, titanium nanoparticles and palladium nanoparticles. Metal nanoparticles have characteristic optical properties (for example, strong light absorption bands) in the ultraviolet to visible region due to surface plasmon resonance (SPR). For example, gold (Au) nanoparticles absorb light having a wavelength close to 530 nm (green to cyan light) and emit light of a bluish-red color (a purplish red color) known as "maroon". Therefore, in cases where a red or purple coloring material is to be prepared, gold nanoparticles can be advantageously used as metal nanoparticles. In addition, silver (Ag) nanoparticles absorb light having a wavelength close to 420 nm (blue light) and emit yellow light. Therefore, in cases where an orange or yellow coloring material is to be prepared, silver nanoparticles can be advantageously used as metal nanoparticles.

In a preferred aspect, the D50 particle diameter of the metal nanoparticles is 5 nm or more, and is typically 10 nm or more, for example 15 nm or more. In another preferred aspect, the D50 particle diameter of the metal nanoparticles is approximately 80 nm or less, and is typically 50 nm or less, for example 30 nm or less. By setting the D50 particle diameter to fall within the range mentioned above, the absorbance of light of a specific wavelength by the metal nanoparticles increases and a good color can be achieved at a low added quantity. In addition, it is possible to obtain a dense colored part having little color variation.

(Glass)

The inorganic solids can contain a glass component in addition to the inorganic pigment described above. By incorporating a glass in the inkjet ink, adhesive properties (and also durability) of a printed layer after firing are improved and it is possible to form a glossy colorful decorative part on a surface of a ceramic substrate.

Examples of types of glass able to exhibit such properties include $SiO_2$—$B_2O_3$-based glasses, $SiO_2$—RO-based glasses (RO denotes an oxide of a group 2 element, such as MgO, CaO, SrO or BaO; the same definition applies hereinafter), $SiO_2$—RO—$R_2O$-based glasses ($R_2O$ denotes and oxide of an alkali metal element, such as $Li_2O$, $Na_2O$, $K_2O$, $Rb_2O$, $Cs_2O$ or $Fr_2O$, and especially $Li_2O$; the same definition applies hereinafter), $SiO_2$—$B_2O_3$—$R_2O$-based glasses, $SiO_2$—RO—ZnO-based glasses, $SiO_2$—RO—$ZrO_2$-based glasses, $SiO_2$—RO—$Al_2O_3$-based glasses, $SiO_2$—RO—$Bi_2O_3$-based glasses, $SiO_2$—$R_2O$-based glasses, $SiO_2$—ZnO-based glasses, $SiO_2$—$ZrO_2$-based glasses, $SiO_2$—$Al_2O_3$-based glasses, RO—$R_2O$-based glasses, and RO—ZnO-based glasses. Moreover, these glasses may contain one or two or more other components in addition to the primary constituent components that appear in the designations above. In addition, the glass may be a crystal-containing crystallized glass in addition to an ordinary amorphous glass.

In a preferred aspect, if the amount of the overall glass is taken to be 100 mol %, $SiO_2$ accounts for at least half (50 mol %). The proportion of $SiO_2$ can be not more than approximately 80 mol %. In addition, it is possible to add components such as RO, $R_2O$ and $B_2O_3$ in order to improve the melting properties of the glass. In a preferred aspect, if the amount of the overall glass is taken to be 100 mol %, RO accounts for 0 to 35 mol %. In another preferred aspect, if the amount of the overall glass is taken to be 100 mol %, $R_2O$ accounts for 0 to 10 mol %. In another preferred aspect, if the amount of the overall glass is taken to be 100 mol %, $B_2O_3$ accounts for 0 to 30 mol %.

In addition, in a preferred aspect, the glass is constituted from a multi-component system having four or more components (for example, five or more components). Physical stability is improved by constituting in this way. For example, components such as $Al_2O_3$, ZnO, CaO and $ZrO_2$ may be added at a proportion of, for example, at least 1 mol %. The chemical durability and abrasion resistance of a decorative part can be improved by constituting in this way. In a preferred aspect, if the amount of the overall glass is taken to be 100 mol %, $Al_2O_3$ accounts for 0 to 10 mol %.

In a preferred aspect, if the amount of the overall glass is taken to be 100 mol %, $ZrO_2$ accounts for 0 to 10 mol %.

The coefficient of linear thermal expansion (the average coefficient of linear expansion measured within the temperature range of 25° C. to 500° C. using a thermomechanical analysis apparatus; the same definition applies hereinafter) of the glass is not particularly limited, but can be, for example, $4.0 \times 10^{-6}$ $K^{-1}$ to $8.0 \times 10^{-1}$ to $K^{-1}$. By constituting in this way, the difference in shrinkage rate from a substance to be decorated (a ceramic) during image firing is reduced and peeling, cracking, and the like, are unlikely to occur in a decorated part. In addition, the yield point of the glass is not particularly limited, but can be, for example, 400° C. to 700° C. In addition, the glass transition temperature (Tg value obtained on the basis of differential scanning calorimetry; the same definition applies hereinafter) of the glass is not particularly limited, but can be, for example, 400° C. to 700° C.

A borosilicate glass A constituted from the following composition in terms of molar ratios in terms of oxide:

40 to 70 mol % (for example, 50 to 60 mol %) of $SiO_2$;
10 to 40 mol % (for example, 20 to 30 mol %) of $B_2O_3$;
3 to 20 mol % (for example, 5 to 10 mol %) of $R_2O$ (at least one of $Li_2O$, $Na_2O$, $K_2O$ and $Rb_2O$);
0 to 20 mol % (for example, 5 to 10 mol %) of $Al_2O_3$; and
0 to 10 mol % (for example, 3 to 6 mol %) of $ZrO_2$, with the amount of the overall glass being taken to be 100 mol %, can be given as a preferred example of the glass disclosed here. The ratio of $SiO_2$ relative to the overall glass matrix of the borosilicate glass A is, for example, at least 40 mol %, and may typically be not more than 70 mol %, for example not more than 65 mol %. The ratio of $B_2O_3$ relative to the overall glass matrix is typically at least 10 mol %, for example, at least 15 mol %, and may typically be not more than 40 mol %, for example not more than 35 mol %. The ratio of $R_2O$ relative to the overall glass matrix is typically at least 3 mol %, for example, at least 6 mol %, and may typically be not more than 20 mol %, for example not more than 15 mol %. In a preferred aspect, the borosilicate glass A contains $Li_2O$, $Na_2O$ and $K_2O$ as $R_2O$. The ratio of $Li_2O$ relative to the overall glass matrix can be, for example at least 3 mol % and not more than 6 mol %. The ratio of $K_2O$ relative to the overall glass matrix can be, for example at least 0.5 mol % and not more than 3 mol %. The ratio of $Na_2O$ relative to the overall glass matrix can be, for example at least 0.5 mol % and not more than 3 mol %. The ratio of $Al_2O_3$ relative to the overall glass matrix is typically at least 3 mol %, and may typically be not more than 20 mol %, for example not more than 15 mol %. The ratio of $ZrO_2$ relative to the overall glass matrix is typically at least 1 mol %, and may typically be not more than 10 mol %, for example not more than 8 mol %.

In addition, the borosilicate glass A may contain additional components other than those mentioned above. Such additional components are in the form of, for example, oxides, and examples thereof include BeO, MgO, CaO, SrO, BaO, ZnO, $Ag_2O$, $TiO_2$, $V_2O_5$, FeO, $Fe_2O_3$, $Fe_3O_4$, CuO, $Cu_2O$, $Nb_2O_5$, $P_2O_5$, $La_2O_3$, $CeO_2$, $Bi_2O_3$ and $Pb_2O_3$. As a general guideline, additional components may be contained at a total proportion of not more than 10 mol % if the amount of the overall glass matrix is taken to be 100 mol %.

Features disclosed here can be advantageously carried out in an aspect in which an inorganic pigment such as metal nanoparticles are mixed and dispersed in the borosilicate glass A.

A glass B, at least 90 mol % of which is constituted from the following composition in terms of molar ratios in terms of oxide:

45 to 70 mol % (for example, 50 to 60 mol %) of $SiO_2$;
0.1 to 6 mol % (for example, 1 to 5 mol %) of $SnO_2$;
1 to 15 mol % (for example, 4 to 10 mol %) of ZnO;
15 to 35 mol % (for example, 20 to 30 mol %) of RO (at least one of BeO, MgO, CaO, SrO and BaO);
0 to 5 mol % (for example, 1 to 5 mol %) of $R_2O$ (at least one of $Li_2O$, $Na_2O$, $K_2O$ and $Rb_2O$); and
0 to 3 mol % (for example, 0 to 1 mol %) of $B_2O_3$, with the amount of the overall glass being taken to be 100 mol %, can be given as another preferred example of the glass disclosed here.

The ratio of $SiO_2$ relative to the overall glass matrix of glass B is, for example, at least 50 mol %, and may typically be not more than 65 mol %, for example not more than 60 mol %. The ratio of $SnO_2$ relative to the overall glass matrix is typically at least 0.5 mol %, for example, at least 1 mol %, and may typically be not more than 5.5 mol %, for example not more than 5 mol %. The ratio of ZnO relative to the overall glass matrix is typically at least 2 mol %, for example, at least 4 mol %, and may typically be not more than 12 mol %, for example not more than 10 mol %. The ratio of RO relative to the overall glass matrix is typically at least 18 mol %, for example, at least 20 mol %, and may typically be not more than 32 mol %, for example not more than 30 mol %. The ratio of $R_2O$ relative to the overall glass matrix is generally at least 0.1 mol %, for example, at least 1 mol %, and may typically be not more than 3 mol %. The ratio of $B_2O_3$ relative to the overall glass matrix may typically be not more than 1 mol %, for example not more than 0.1 mol %.

In addition, the glass B may contain additional components other than those mentioned above. Such additional components are in the form of, for example, oxides, and examples thereof include $Ag_2O$, $Al_2O_3$, $ZrO_2$, $TiO_2$, $V_2O_5$, FeO, $Fe_2O_3$, $Fe_3O_4$, CuO, $Cu_2O$, $Nb_2O_5$, $P_2O_5$, $La_2O_3$, $CeO_2$ and $Bi_2O_3$. As a general guideline, additional components may be contained at a total proportion of not more than 10 mol % if the amount of the overall glass matrix is taken to be 100 mol %.

Features disclosed here may be advantageously carried out in an aspect in which the metal nanoparticles described above are mixed in the glass matrix of the glass B. The proportion of coloring agents contained in the glass B is not particularly limited, but is not more than approximately 1 vol %, and typically not more than 0.8 vol %, and should be, for example, not more than 0.7 vol %, if the overall volume of the glass B and coloring agents is taken to be 100 vol %. By constituting in this way, a vividly colored part can be stably achieved.

The glass B may further contain a protecting agent. By incorporating a protecting agent in the glass B, a coloring agent component (metal nanoparticles) and a glass component are unlikely to come into contact during image firing and incorporation of a coloring agent as a constituent component of the glass can be better prevented. Therefore, it is possible to realize a colored part having a distinct hue and significantly better chromogenic properties. A protecting agent is typically mixed in the glass matrix together with a coloring agent.

The protecting agent is not particularly limited, but can be, for example, nanometer order-sized (1 to 100 nm) ceramic nanoparticles, specific examples of which include silica nanoparticles, zirconia nanoparticles, alumina nanoparticles and titania nanoparticles. Of these, silica has the property of transparency increasing when sintered, and can therefore achieve advantageous effects such as improving the chromogenic properties of a colored part and enhancing gloss by increasing specular glossiness. Therefore, silica nanoparticles can be used particularly advantageously as a protecting agent.

The proportion of glass in the inorganic solids disclosed here (that is, the proportion of glass among the total amount of inorganic solids) is not particularly limited, but is typically at least 20 mass %, preferably at least 30 mass %, more preferably at least 40 mass %, further preferably at least 45 mass %, and particularly preferably at least 50 mass %. As described above, by increasing the proportion of glass, peeling of a printed layer following firing can be more effectively prevented. In addition, it is possible to form a glossy colorful decorative part on a surface of a ceramic substrate. The proportion of glass may be, for example, at least 60 mass %, and may typically be at least 75 mass %. In addition, from perspectives such as stably realizing a decorative part, the proportion of glass should be not more than 99 mass %, preferably not more than 98 mass %, and more preferably not more than 96 mass %. Features disclosed here can be advantageously carried out in an aspect in which the proportion of glass in the inorganic solids is at least 20 mass % and not more than 99 mass % (and more preferably at least 50 mass % and not more than 96 mass %).

The volume ratio of inorganic solids relative to the total volume of the inkjet ink is at least approximately 10 vol %. By increasing the volume ratio of inorganic solids, the durability of the printed layer (and especially durability against thermal shrinkage during firing) is improved and peeling of a printed layer (decorative part) following firing can be more effectively prevented. In addition, a colorful image can be formed. From these perspectives, this volume ratio is preferably at least 12 vol %, and more preferably at least 13 vol %. In addition, from perspectives such as inhibiting an increase in ink viscosity and maintaining good printability (for example, discharge properties of an ink from a discharge nozzle), the volume ratio of inorganic solids should typically be not more than 20 mass %, and preferably not more than 18 mass %. From the perspective of achieving a balance between printability and prevention of peeling of a printed layer, an ink in which this volume ratio is at least 10 mass % and not more than 20 mass % (and especially at least 14 mass % and not more than 18 mass %) is particularly preferred.

< Photocurable Monomer Component>

The inkjet ink disclosed here contains a photocurable monomer component (hereinafter abbreviated to "photocurable monomer"), which is a monomer other than an N-vinyl compound. This photocurable monomer is typically a liquid, and is a monomer of a resin that is cured through polymerization (or crosslinking) when irradiated with light (for example, ultraviolet radiation). By using a photocurable ink containing such a monomer component, even if printing is carried out on a ceramic substrate having poor water absorption properties, an ink can be fixed at a sufficient thickness without blurring.

(Monofunctional Monomer)

The monomer component mentioned above includes a monofunctional monomer. The monofunctional monomer is constituted from one functional group (typically a polymerizable functional group) and a residue obtained by removing the functional group. And a photocurable resin is cured as a result of the functional group being polymerized. The structure of the residue in the monofunctional monomer is not particularly limited, and may be a straight chain structure or a cyclic structure. However, because the viscosity of the ink increases as the number of carbon atoms in the residue in the monofunctional monomer increases, it is preferable to decide the number of carbon atoms in the residue in the monofunctional monomer in view of printability (for example discharge properties from a discharge nozzle). For example, the number of carbon atoms in the residue in the monofunctional monomer is preferably 3 to 11.

The monofunctional monomer may be, for example, a (meth)acrylate compound having one (meth)acryloyl group in the molecule. The "(meth)acryloyl group" mentioned here encompasses one or both of a methacryloyl group ($CH_2$=$CCH_3COO$—) and an acryloyl group ($CH_2$=$CHCOO$—). By using this type of (meth)acrylate compound, peeling of a printed layer following firing can be more effectively prevented. This type of (meth)acrylate compound is preferred from perspectives such as dispersibility and photocuring properties of the inorganic pigment.

Specific examples of the monofunctional monomer having one (meth)acryloyl group in the molecule include isobornyl acrylate, benzyl acrylate, cyclic trimethylolpropane formal acrylate, phenoxyethyl acrylate, tetrahydrofurfuryl acrylate, methoxyethyl acrylate, cyclohexyl acrylate, ethyl carbitol acrylate, (2-methyl-2-ethyl-1,3-dioxolan-4-yl)methyl acrylate, hydroxyethyl acrylate, hydroxypropyl acrylate, 4-hydroxybutyl acrylate, methyl (meth)acrylate, ethyl acrylate, propyl acrylate, butyl acrylate, pentyl acrylate, n-stearyl acrylate, butoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxybutyl (meth)acrylate, 2-hydroxy-3-phenoxypropyl (meth)acrylate, t-butylcyclohexyl (meth)acrylate, isoamyl acrylate, lauryl (meth)acrylate, octyl acrylate, isooctyl (meth)acrylate, isononyl acrylate, decyl acrylate, isodecyl acrylate, tridecyl (meth)acrylate, isomyristyl acrylate, isostearyl acrylate, 2-ethylhexyl acrylate, 2-ethylhexyldiglycol acrylate, 4-hydroxybutyl acrylate, methoxydiethylene glycol acrylate, methoxytriethylene glycol acrylate, ethoxydiethylene glycol acrylate, 2-(2-ethoxyethoxy)ethyl acrylate, 2-ethylhexylcarbitol acrylate and phenoxyethoxyethyl acrylate. It is possible to use one of the above-mentioned (meth)acrylate compounds in isolation or a combination of two or more types thereof. Of these, isobornyl acrylate, benzyl acrylate, cyclic trimethylolpropane formal acrylate, phenoxyethyl acrylate, tetrahydrofurfuryl acrylate, methoxyethyl acrylate, cyclohexyl acrylate, ethyl carbitol acrylate, (2-methyl-2-ethyl-1,3-dioxolan-4-yl)methyl acrylate, hydroxyethyl acrylate, hydroxypropyl acrylate and 4-hydroxybutyl acrylate are preferred, and isobornyl acrylate, benzyl acrylate, cyclic trimethylolpropane formal acrylate and phenoxyethyl acrylate are particularly preferred.

The monofunctional monomer may be a monomer other than a (meth)acrylate compound. Examples thereof include monofunctional monomers having a vinyl ether group, such as butyl vinyl ether, butyl propenyl ether, butyl butenyl ether, hexyl vinyl ether, ethylhexyl vinyl ether, phenyl vinyl ether and benzyl vinyl ether; monofunctional monomers having an allyl ether group, such as phenyl allyl ether; monofunctional monomers having an acetyl vinyl group, such as vinyl acetate; and monofunctional monomers having a (meth)acrylamide group, such as acrylamide and methacrylamide.

The molecular weight of the monofunctional monomer is not particularly limited, but from perspectives such as inhibiting an increase in ink viscosity, is typically not more than 300, preferably not more than 280, more preferably not more than 260, and further preferably not more than 240. In a preferred aspect, the molecular weight of the monofunctional monomer may be, for example, not more than 220, and may typically be not more than 200 (less than 200). In addition, the molecular weight of the monofunctional monomer is typically at least 100, and is preferably at least 110, more preferably at least 120, and further preferably at least 130 from perspectives such as preventing peeling of a printed layer. The molecular weight of the monofunctional monomer may be, for example, at least 140, and may typically be at least 150. If the molecular weight of the monofunctional monomer falls within such a range, it is possible to inhibit an increase in the viscosity of an ink while being able to more effectively fix a desired image on a ceramic substrate.

(Other Monomer Components)

The monomer component disclosed here can contain resin materials other than the monofunctional monomer described above (for example, difunctional monomers, trifunctional monomers, tetrafunctional to hexafunctional monomers, oligomers, and the like).

Examples of difunctional monomers include (meth)acrylate compounds having two (meth)acryloyl groups in the molecule. Examples of (meth)acrylate compounds having two (meth)acryloyl groups in the molecule include 1,9-nonane diol di(meth)acrylate, 1,6-hexane diol di(meth)acrylate, 1,4-butane diol di(meth)acrylate, tricyclodecanedimethanol diacrylate, hydroxypivalic acid neopentyl glycol diacrylate, triethylene glycol di(meth)acrylate, tetramethylene glycol di(meth)acrylate, tripropylene glycol di(meth)acrylate, polypropylene glycol di(meth)acrylate, 1,3-butane diol di(meth)acrylate, neopentyl glycol di(meth)acrylate, hexane diol di(meth)acrylate, cyclohexane-1,4-dimethanol di(meth)acrylate, cyclohexane-1,3-dimethanol di(meth)acrylate, 1,4-cyclohexane diol di(meth)acrylate, tetraethylene glycol di(meth)acrylate, pentaerythritol di(meth)acrylate, dipentaerythritol di(meth)acrylate, neopentyl glycol di(meth)acrylate, polytetramethylene glycol di(meth)acrylate, bisphenol A 3.8-mol EO adduct diacrylate and an acrylic acid adduct of bisphenol A diglycidyl ether.

Examples of trifunctional monomers include (meth)acrylate compounds having three (meth)acryloyl groups in the molecule. Examples of (meth)acrylate compounds having three (meth)acryloyl groups in the molecule include trimethylolpropane tri(meth)acrylate, trimethylolethane tri(meth)acrylate, trimethyloloctane tri(meth)acrylate, pentaerythritol tri(meth)acrylate, trimethylolpropane polyethoxy tri(meth)acrylate, dipentaerythritol tri(meth)acrylate, trimethylolpropane tri((meth)acryloyloxypropyl) ether, propionic acid dipentaerythritol tri(meth)acrylate, tri((meth)acryloyloxyethyl) isocyanurate, tris(2-hydroxyethyl) isocyanurate tri(meth)acrylate and sorbitol tri(meth)acrylate.

Examples of tetrafunctional to hexafunctional monomers include (meth)acrylate compounds having 4 to 6 (meth)acryloyl groups in the molecule. Examples of (meth)acrylate compounds having 4 to 6 (meth)acryloyl groups in the molecule include ditrimethylolpropane tetra(meth)acrylate, pentaerythritol polyethoxy tetra(meth)acrylate, pentaerythritol polyproxy tetra(meth)acrylate, sorbitol tetra(meth)acrylate, propionic acid dipentaerythritol tetra(meth)acrylate, ethoxylated pentaerythritol tetra(meth)acrylate, sorbitol penta(meth)acrylate, dipentaerythritol penta(meth)acrylate, dipentaerythritol hexa(meth)acrylate and sorbitol hexa(meth)acrylate.

Features disclosed here can be carried out in an aspect in which the proportion of a monofunctional monomer relative to the total amount of the photocurable monomer mentioned above (in an ink containing two or more types of monofunctional monomer, the total proportion thereof) is at least 90 mass %. It is thought that shrinkage of a polymer during curing tends to decrease as the number of functional groups in a monomer reduces. Therefore, by increasing the proportion of a monofunctional monomer in the photocurable monomer, it is possible to reduce curing shrinkage and reduce residual stress in a printed layer. As a result, it is possible to prevent peeling of a printed layer caused by residual stress (for example, cases where an edge of a printed layer warps and deforms due to residual stress and peels from a ceramic substrate). From perspectives such as reducing residual stress in a printed layer, the proportion of the monofunctional monomer is preferably at least 92 mass %, more preferably at least 94 mass %, further preferably at least 96 mass %. The proportion of the monofunctional monomer may be, for example, at least 98 mass %, and may typically be at least 99 mass %. Of these, an inkjet ink in which 100 mass % of the photocurable monomer component contained in the inkjet ink is monofunctional monomers is preferred.

The content of the photocurable monomer in the inkjet ink is not particularly limited as long as the ratio of the content of the N-vinyl compound and that of the photocurable monomer falls within the range described below, but should generally be at least 10 mass % and not more than 60 mass %. The content of the photocurable monomer is preferably at least 15 mass % and not more than 55 mass %, more preferably at least 18 mass % and not more than 52 mass %, and further preferably at least 20 mass % and not more than 50 mass %. Features disclosed here can be advantageously carried out in an aspect in which the content of the photocurable monomer in the inkjet ink is at least 25 mass % and not more than 45 mass %.

< N-Vinyl Compound>

The inkjet ink disclosed here contains a nitrogen atom-containing N-vinyl compound in addition to the photocurable monomer component described above. The N-vinyl compound is not particularly limited as long as this is a structure in which an unsaturated ethylene group (for example, a vinyl group) is bonded to a nitrogen (N) atom in a nitrogen-containing compound. An example of the N-vinyl compound disclosed here is an N-vinyl compound represented by general formula (1) below.

$$CH_2=CR^1-NR^2R^3 \qquad (1)$$

In general formula (1) above, $R^1$ is a hydrogen atom, an alkyl group having 1 to 4 carbon atoms, a phenyl group, a benzyl group or a halogen atom. Of these, a hydrogen atom or an alkyl group having 1 to 4 carbon atoms is preferred, and a hydrogen atom is particularly preferred. Examples of alkyl groups having 1 to 4 carbon atoms include methyl groups, ethyl groups, propyl groups and butyl groups. $R^2$ and $R^3$ may be groups selected from among hydrogen atoms, optionally substituted alkyl groups, alkenyl groups, alkynyl groups, aralkyl groups, alkoxy groups, alkoxyalkyl groups, alkylol groups, acetyl groups ($CH_3CO-$) and aromatic groups. Of these, optionally substituted alkyl groups and acetyl groups are preferred. $R^2$ and $R^3$ may be the same as, or different from, each other. The total number of carbon atoms in the optionally substituted alkyl groups, alkenyl groups, alkynyl groups, aralkyl groups, alkoxy groups, alkoxyalkyl groups, alkylol groups and acetyl groups is 1 to 20. This total number of carbon atoms is preferably 1 to 10, more preferably 1 to 6, and further preferably 1 to 4. The optionally substituted alkyl groups, alkenyl groups, alkynyl groups, aralkyl groups, alkoxy groups, alkoxyalkyl groups, alkylol groups and acetyl groups may be chain-like or cyclic, but chain-like groups are preferred. Here, the term "chain-like" means straight chain-like or branched. The aromatic groups are optionally substituted aryl groups. The total number of carbon atoms in the aromatic groups is 6 to 36. This total number of carbon atoms is preferably 6 to 24, more preferably 6 to 18, and further preferably 6 to 12. Substituent groups able to be present in the alkyl groups, alkenyl groups, alkynyl groups, aralkyl groups, alkoxy groups, alkoxyalkyl groups, alkylol groups, acetyl groups and aromatic groups mentioned above include hydroxyl groups; and halogen atoms such as fluorine atoms and chlorine atoms.

In general formula (1) above, $R^2$ and $R^3$ may bond to each other to form a cyclic structure. That is, $-NR^2R^3$ may a cyclic structure ($-R^2NR^3-$) in which $R^2$ and $R^3$ bond to each other via a nitrogen atom. The cyclic structure mentioned here can be, for example, an aliphatic heterocyclic structure or an aromatic heterocyclic structure. The aliphatic heterocyclic structure and aromatic heterocyclic structure may be monocyclic structures or fused ring structures. The total number of atoms that constitute the ring(s) in the aliphatic heterocyclic structure and aromatic heterocyclic structure is 3 to 20, preferably 3 to 15, more preferably 3 to 12, and further preferably 3 to 10. The aliphatic heterocyclic structure and aromatic heterocyclic structure may contain at least two nitrogen atoms as atoms that constitute the ring(s). In addition to carbon atoms and nitrogen atoms, the aliphatic heterocyclic structure and aromatic heterocyclic structure may contain oxygen atoms and sulfur atoms as atoms that constitute the ring(s). In cases where the cyclic structure is an aliphatic heterocyclic structure, $-R^2NR^3-$ can be $-CH_2C(=O)N(CH_2)_n-$. In such cases, n is preferably an integer of from 1 to 10. The value of n is more preferably 2 to 6, and particularly preferably 2 to 4.

A preferred example of the N-vinyl compound is a compound in which $R^1$ is a hydrogen atom or a methyl group and $R^2$ and $R^3$ bond to each other to form a cyclic structure. Specific examples of this type of N-vinyl compound include N-vinyl-2-caprolactam, N-vinyl-2-pyrrolidone, N-vinyl-3-morpholinone, N-vinylpiperidine, N-vinylpyrrolidine, N-vinylaziridine, N-vinylazetidine, N-vinylimidazole, N-vinylmorpholine, N-vinylpyrazole, N-vinylvalerolactam, N-vinylcarbazole and N-vinylphthalimide. Of these, N-vinyl-2-caprolactam is preferred.

Other examples of the N-vinyl compound may include compounds in which $R^1$ is a hydrogen atom or a methyl group and $R^2$ and $R^3$ are groups selected from alkyl groups, alkenyl groups, alkynyl groups, aralkyl groups, alkoxy groups, alkoxyalkyl groups, alkylol groups, acetyl groups and aromatic groups. Specific examples of this type of N-vinyl compound include N-vinylformamide, N-vinylacetamide, N-methyl-N-vinylformamide and N-methyl-N-vinylacetamide. It is possible to use one of these N-vinyl compounds in isolation or a combination of two or more types thereof.

By using the N-vinyl compound at a specific proportion in combination with the photocurable monomer mentioned above, peeling of a printed layer following firing can be more effectively prevented. The reason why such an effect can be achieved cannot be explained particularly definitively, but is thought to be as follows. That is, the monofunctional monomer that constitutes the primary component of the photocurable monomer has the effect of reducing shrinkage during curing and reducing residual stress in a printed layer (cured film), but because it is difficult for a polymerized polymer to form a three-dimensional structure, the strength of a cured film tends to be weak. Conversely, the N-vinyl compound facilitates curing of a polymer without having an adverse effect on curing shrinkage because a generated radical exhibits high reactivity with the monofunctional monomer. In addition, because the N-vinyl compound per se has a rigid skeleton, the elastic modulus of the polymer is improved without increasing the crosslinking density. Therefore, in addition to the residual stress reduction effect achieved by the monofunctional monomer, deformation (typically warping deformation) of a printed layer during firing is unlikely to occur. This is thought to contribute to prevention of peeling of the printed layer.

From the perspective of better exhibiting the advantageous effect achieved by using a combination of the N-vinyl compound and the monomer component, the ratio of the content of the N-vinyl compound and that of the monomer component (N-vinyl compound/monomer component) in the inkjet ink should be 0.05 to 0.8 in terms of mass. This content ratio may be, for example, 0.1 to 0.7, may typically be 0.1 to 0.5 (for example, 0.15 to 0.4), and may be 0.1 to 0.25 (for example, 0.15 to 0.25).

The content of the N-vinyl compound in the inkjet ink is not particularly limited as long as the ratio of the content of the N-vinyl compound and that of the monomer component falls within the range mentioned above, but should generally be at least 1.5 mass % and not more than 22 mass %. The content of the monomer component may be, for example, at least 2 mass % and not more than 20 mass %, and may typically be at least 5 mass % and not more than 15 mass %.

<Other Components>

As long as the advantageous effect of the present invention is not impaired, the inkjet ink disclosed here may, if necessary, contain publicly known additives used in inkjet inks (typically inkjet inks used for ceramic substrates to be fired), such as photopolymerization initiators, dispersing agents, binders and viscosity modifiers. The content of such additives should be set as appropriate according to the purpose of the additive, and detailed explanations are omitted as this content value does not characterize the present invention.

(Photopolymerization Initiator)

The inkjet ink disclosed here may contain a photopolymerization initiator. The photopolymerization initiator can be selected, as appropriate, from among photopolymerization initiators used in the past. Examples of such photopolymerization initiators include radical type photopolymerization initiators such as alkylphenone-based photopolymerization initiators and acylphosphine oxide-based photopolymerization initiators. For example, α-aminoalkylphenone-based photopolymerization initiators (for example, 2-methyl-1-(4-methylthiophenyl)-2-morpholino-propan-1-one and 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, and the like) can be advantageously used as this type of alkylphenone-based photopolymerization initiator. In addition, additional examples of alkylphenone-based photopolymerization initiators include α-hydroxyalkylphenone-based photopolymerization initiators (1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, and the like).

Of the variety of photopolymerization initiators mentioned above, α-aminoalkylphenone-based photopolymerization initiators such as 2-methyl-1-(4-methylthiophenyl)-2-morpholinopropan-1-one exhibit high reactivity, can improve curing speed and are excellent in terms of thin film curing properties and surface curing properties, and can therefore be used particularly advantageously.

(Dispersing Agent)

The inkjet ink disclose here may contain a dispersing agent. For example, a cationic dispersing agent can be used as the dispersing agent. This type of cationic dispersing agent efficiently adheres to the surface of the inorganic pigment by means of an acid-base reaction, and can therefore prevent aggregation of, and advantageously disperse, the inorganic pigment, unlike other types of dispersing agent, such as phosphoric acid-based dispersing agents. Amine-based dispersing agents can be given as an example of this type of cationic dispersing agent. This type of amine-based dispersing agent can prevent the inorganic pigment from aggregating by means of steric hindrance, and can stabilize the inorganic pigment. In addition, this type of amine-based dispersing agent can impart inorganic pigment particles with the same charge, and can therefore advantageously prevent aggregation of the inorganic pigment in this way also. Therefore, it is possible to advantageously reduce the ink viscosity and greatly improve printability. Examples of this type of amine-based dispersing agent include fatty acid amine-based dispersing agents and polyester amine-based dispersing agents, and DISPERBYK-2013 available from BYK Japan KK, for example, can be advantageously used.

In addition, it is possible to add a variety of additives other than the materials mentioned above to the inkjet ink for a ceramic substrate according to the present embodiment. Examples of such additives include glass binders, which are used for adhesion between the inorganic pigment and the ceramic substrate during firing, and organic solvents, which are added in small quantities in order to adjust the viscosity.

< Preparation of Inkjet Ink>

Figure 1:
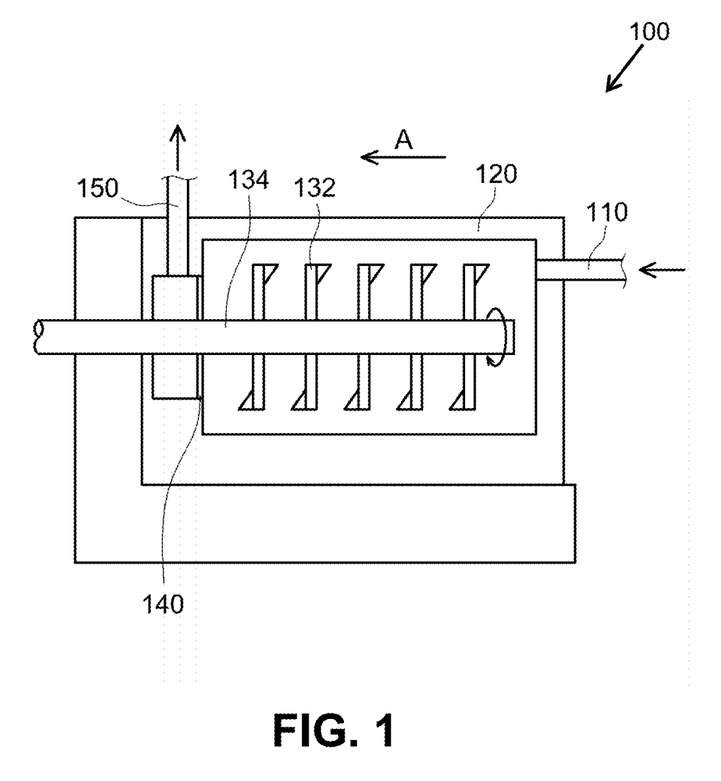
FIG. 1 is a cross-sectional view that schematically illustrates a stirring pulverizer used to produce an inkjet ink for a ceramic substrate.

The inkjet ink for a ceramic substrate can be prepared (produced) by mixing the materials described above at prescribed proportions. FIG. 1 is a cross-sectional view that schematically illustrates a stirring pulverizer used to produce the inkjet ink for a ceramic substrate. Moreover, the explanations given below are not intended to limit the inkjet ink for a ceramic substrate disclosed here.

When the inkjet ink for a ceramic substrate according to the present embodiment is produced, a slurry that is a precursor substance of the ink is first prepared by weighing out and mixing the materials described above.

Next, the slurry is stirred and inorganic solids in the slurry are pulverized using a stirring pulverizer 100 such as that shown in FIG. 1. Specifically, pulverizing beads (for example, zirconia beads having diameters of 0.5 mm) are added to the slurry, and the slurry is then supplied to a stirring container 120 from a supply port 110. A shaft 134 having a plurality of stirring vanes 132 is housed in the stirring container 120. A motor (not shown) is attached to one end of the shaft 134, and by causing the shaft 134 to rotate by operating the motor, the slurry is stirred while being pushed towards the downstream side in the feeding direction A by the plurality of stirring vanes 132. Here, the inorganic solids are pulverized by the pulverizing beads added to the slurry, and finely pulverized inorganic solids can be dispersed.

In addition, the slurry pushed towards the downstream side in the feeding direction A passes through a filter 140. Due to this configuration, the pulverizing beads and inorganic solids that have not been finely particulated are trapped by the filter 140, and an inkjet ink for a ceramic substrate, in which inorganic solids have been advantageously dispersed in a finely particulate state, is discharged from a discharge port 150.

<Printing Method>

Next, an explanation will be given for drawing an image on a ceramic substrate using the inkjet ink for a ceramic substrate according to the present embodiment.

Figure 2:
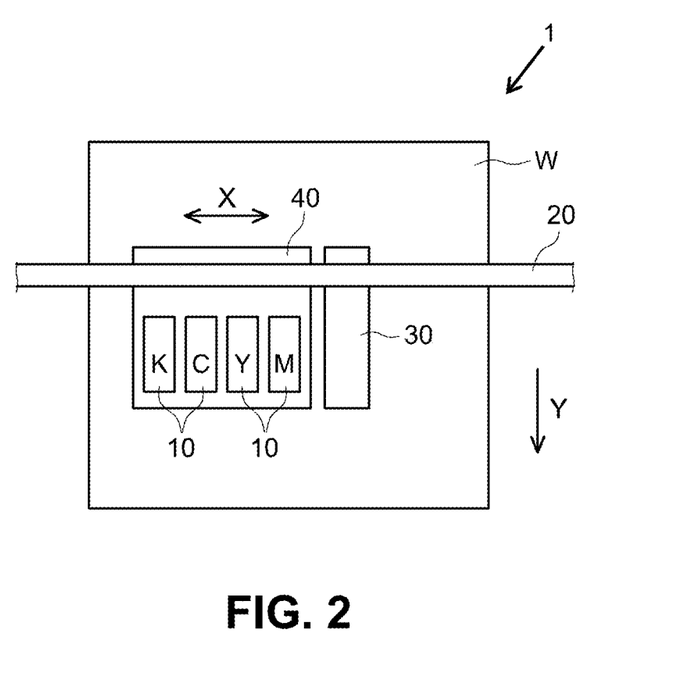
FIG. 2 is an overall view that schematically illustrates an example of an inkjet apparatus.
Figure 3:
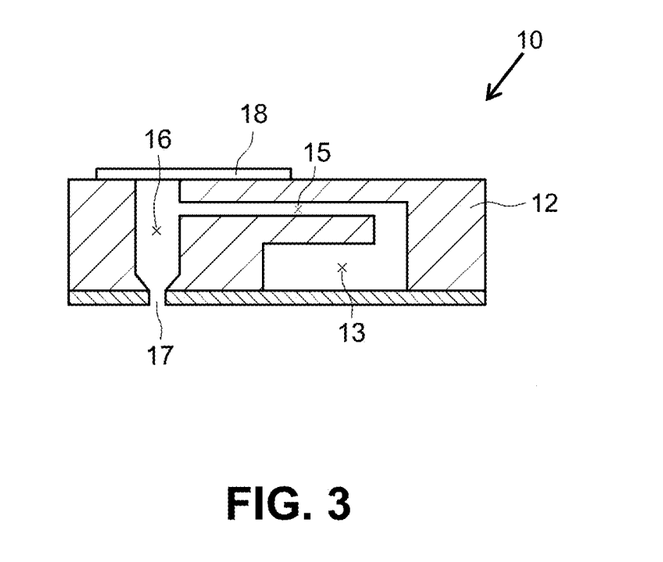
FIG. 3 is a cross-sectional view that schematically illustrates an inkjet head of the inkjet apparatus shown in FIG. 2.

FIG. 2 is an overall view that schematically illustrates an example of an inkjet apparatus. FIG. 3 is a cross-sectional view that schematically illustrates an inkjet head of the inkjet apparatus shown in FIG. 2.

The inkjet ink for a ceramic substrate according to the present embodiment is stored in an inkjet head 10 of an inkjet apparatus 1 shown in FIG. 2. This inkjet apparatus 1 is provided with four inkjet heads 10, and inkjet inks for a ceramic substrate having four different colors, namely black (K), cyan (C), yellow (Y) and magenta (M), are stored in these inkjet heads 10. In addition, the inkjet heads 10 are housed inside a print cartridge 40. A guide shaft 20 is inserted into this print cartridge 40, and the print cartridge moves back and forth along the axial direction X of the guide shaft 20. Although not shown in the drawings, this inkjet apparatus 1 is provided with a moving means for moving the guide shaft 20 in a direction Y perpendicular to the axial direction of the guide shaft. Due to this configuration, it is possible to discharge an ink from an inkjet head 10 towards a desired location on a ceramic substrate W.

In addition, a piezo type inkjet head such as that shown in FIG. 3, for example, can be used as the inkjet head 10 shown in FIG. 2. A storage part 13 in which an ink is stored in a case 12 is provided in this type of piezo type inkjet head 10, and the storage part 13 is connected to a discharge part 16 via a liquid feed path 15. A discharge nozzle 17 that has been opened from the case 12 is provided in this discharge part 16, and a piezo element 18 is arranged so as to oppose the discharge nozzle 17. In addition, by causing the piezo element 18 to vibrate in this type of inkjet head 10, ink in the discharge part 16 is discharged from the discharge nozzle 17 towards the ceramic substrate W (see FIG. 2).

In addition, the UV irradiation means 30 is attached to the guide shaft 20 of the inkjet apparatus 1 shown in FIG. 2. This UV irradiation means 30 is disposed so as to be adjacent to the print cartridge 40, moves as the print cartridge 40 moves back and forth, and irradiates the ceramic substrate W with ultraviolet radiation. Due to this configuration, because it is possible to cure the ink immediately after the ink is deposited on the ceramic substrate W, even if printing is carried out on a ceramic substrate W having poor water absorption properties, the ink can be fixed on the ceramic substrate W at a sufficient depth without blurring. As a result, a cured product of the inkjet ink (a printed layer) deposits on the surface of the ceramic substrate.

Next, the ceramic substrate W on which this cured product (printed layer) has deposited is fired under a condition whereby the maximum firing temperature is set to fall within the range of 500° C. to 1200° C. (preferably 500° C. to 1000° C., and more preferably 600° C. to 900° C.). Here, because an inorganic pigment having excellent heat resistance is used as a pigment in the inkjet ink for a ceramic substrate according to the present embodiment, it is possible to prevent the pigment from becoming discolored (decolored) by the firing treatment. In addition, because the proportion of monofunctional monomers in the photocurable monomer is at least 90 mass %, the volume ratio of inorganic solids relative to the total volume of the inkjet ink is 10 vol % to 20 vol %, and the ratio (N-vinyl compound/monomer component) of the content of the N-vinyl compound and that of the photocurable monomer component in the inkjet ink is 0.05 to 0.8 in terms of mass, peeling of the printed layer in the initial firing stage is eliminated or reduced and a desired image can be reliably adorned on the ceramic substrate.

Moreover, in the explanation above relating to the printing method, the intended use of the inkjet ink for a ceramic substrate disclosed here is not limited.

Specifically, in the explanation above, a method including transferring an ink directly on a surface of a ceramic substrate and depositing a printed layer (cured product) has been given as an example of a printing method. However, when a printed layer is formed using the inkjet ink for a ceramic substrate disclosed here, the ink need not necessarily be discharged directly onto the surface of the ceramic substrate. For example, it is also possible to deposit the ink on a prescribed transfer sheet so as to draw an image, and then transfer the image drawn on the transfer sheet to a ceramic substrate. In this way, even if a ceramic substrate is decorated using a transfer sheet, by using the ink disclosed here, the ink can be fixed on the ceramic substrate at a sufficient depth without blurring, and a desired image can be precisely printed.

<Method of Producing Ceramic Product>

Features disclosed here can include provision of a method of producing a ceramic product having a decorative part. That is, provided by features disclosed here is a method of producing a ceramic product, the method including the steps for: depositing a cured product of any of the inkjet inks disclosed here on a surface of a ceramic substrate; and firing the deposited cured product under a condition whereby a maximum firing temperature is set to fall within a range of 500° C. to 1200° C. This production method can be carried out by advantageously applying the details of any of the printing methods disclosed here. According to this production method, a ceramic product having a decorative part that exhibits excellent durability can be stably (with good production stability) provided.

Next, experimental examples relating to the present invention will be explained, but the experimental examples explained below in no way limit the present invention.

<Inkjet Ink>

Inkjet inks of Examples 1 to 27 were prepared by mixing a photocurable monomer, an N-vinyl compound, inorganic solids, a dispersing agent and a photopolymerization initiator. The type and content (mass %) of the photocurable monomer component used, the type and content (mass %) of the N-vinyl compound, the type and content (mass %) of the inorganic solids, the type and content (mass %) of the dispersing agent and the type and content (mass %) of the photopolymerization initiator in the inkjet inks of these examples are summarized in Table 1 and Table 2. Here, proportions are shown on the basis that the total amount of the composition is 100 mass %. In addition, the proportion (mass %) of the monofunctional monomer in the monomer component, the volume ratio (vol %) of inorganic solids relative to the total volume of the inkjet ink and the proportion of glass in the inorganic solids (mass %) are summarized in Table 1 and Table 2.

Moreover, in Table 1 and Table 2, "IBXA" is isobornyl acrylate (available from Osaka Organic Chemical Industry Ltd.), "BAZ" is benzyl acrylate (available from Osaka Organic Chemical Industry Ltd.), "CTFA" is cyclic trimethylolpropane formal acrylate (available from Osaka Organic Chemical Industry Ltd.), and "PHEA" is phenoxyethyl acrylate (available from Osaka Organic Chemical Industry Ltd.), and these are all monofunctional monomers. "1,9-

NDDA" is 1,9-nonane diol diacrylate (available from Osaka Organic Chemical Industry Ltd.), which is a difunctional monomer. "TMP3A" is trimethylolpropane triacrylate, which is a trifunctional monomer. "NVC" is N-vinylcaprolactam. "Glass A" is a borosilicate glass (coefficient of thermal expansion: $6.1 \times 10^{-6}$ $K^{-1}$, yield point: 555° C.), which is constituted from the following composition, as expressed as molar ratio in terms of oxides: 54.8 mol % of $SiO_2$; 24.1 mol % of $B_2O_3$; 4.7 mol % of $Li_2O$; 1.5 mol % of $K_2O$; 1.9 mol % of $Na_2O$; 8.1 mol % of $Al_2O_3$; 4.9 mol % of $ZrO_2$, with the amount of the overall glass being taken to be 100 mol %. "Magenta" is a material obtained by dispersing Au nanoparticles (a coloring agent) in the glass, and glass accounts for at least 95 mass % of the material composition. "Spinel black" is a black inorganic pigment, and spinel black was used here. "Zircon yellow" is a yellow inorganic pigment, and zircon praseodymium was used here. "Zircon vanadium" is a cyan inorganic pigment. "BYK2013" is an amine-based dispersing agent (DISPERBYK-2013 available from BYK Japan KK). "IQ907" is 2-methyl-1-(4-methylthiophenyl)-2-morpholinopropan-1-one (IIRGACURE 907 available from Toyotsu Chemiplas Corporation), which is an α-aminoalkylphenone-based photopolymerization initiator. Moreover, the volume ratio (vol %) of inorganic solids relative to the total volume of the inkjet ink was determined by converting the content of each material into a volume using the specific gravity of the material in question.

<Evaluation Tests>

Figure 4:
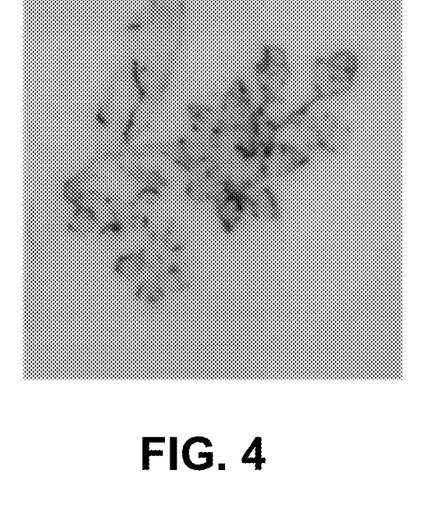
FIG. 4 is a photograph taken after firing a porcelain on which an image has been printed using an ink of a test example.
Figure 5:
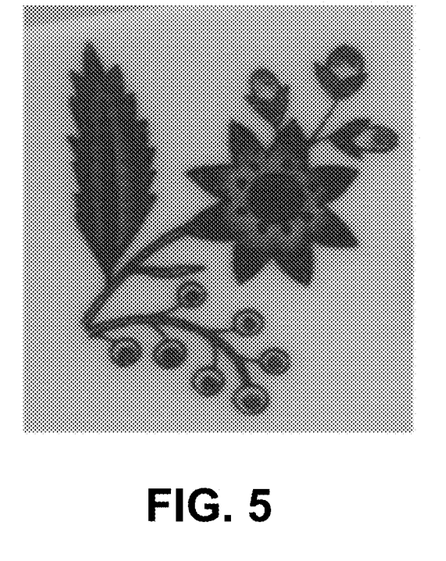
FIG. 5 is a photograph taken after firing a porcelain on which an image has been printed using an ink of a test example.

A pattern was drawn on a transfer sheet with each of the inks of the examples using an inkjet apparatus (a material printer DMP-2831 available from Fujifilm Corporation), and the image drawn on the transfer sheet was transferred to a surface of a porcelain comprising mainly bone ash, kaolin, feldspar, and the like. Next, the porcelain was fired at a temperature of 850° C. FIG. 4 shows a photograph taken after firing a porcelain on which an image has been printed using the ink of Example 1, and FIG. 5 shows a photograph taken after firing a porcelain on which an image has been printed using the ink of Example 8.

In addition, evaluations were carried out into the presence or absence of peeling of images printed on porcelain, gloss value and adhesive properties. The results are shown in Table 1 and Table 2. In "Image peeling" evaluations in Table 1 and Table 2, cases where the ink was not discharged from the inkjet head and an image could not be printed were evaluated as "Printing unavailable", cases where the image peeled after firing and image collapse was observed were evaluated as "Bad", and cases where image collapse was not observed after firing were evaluated as "Very good". In "Gloss" evaluations, cases where an image was not glossy after firing were evaluated as "Bad", cases where an image was slightly glossy after firing were evaluated as "Good", and cases where an image was glossy after firing were evaluated as "Very good". In "Adhesive properties" evaluations, cases where an image completely peeled off when touched lightly by hand after firing were evaluated as "Bad", cases where an image did not completely peel off but partially peeled off when touched by hand after firing were evaluated as "Not bad", cases where an image did not readily peel off when touched by hand after firing were evaluated as "Good", and cases where an image did not peel off even when touched by hand and strongly rubbed after firing were evaluated as "Very good". Moreover, "0.95≤" in the "glass/inorganic solids volume ratio" in Table 1 means at least 0.95.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Photocurable monomer component (mass %) | IBXA (monofunctional) | 9.3 | 20.9 | 20.9 | | 8.4 | | | | |
| | BZA (monofunctional) | | | | | | | | | |
| | CTFA (monofunctional) | | | | | | | | | |
| | PHEA (monofunctional) | | | 10.5 | 20.9 | | 31.4 | 31.4 | 38.4 | 41.9 |
| | NDDA (difunctional) | 37.2 | 20.9 | 10.5 | 20.9 | 33.5 | 10.5 | | 3.5 | |
| | TMP3A (trifunctional) | | | | | | | 10.5 | | |
| N-vinyl compound | NVC (mass %) | | 4.7 | 4.7 | 4.7 | 4.7 | 4.7 | 4.7 | 4.7 | 4.7 |
| Inorganic solids (mass %) | Glass A | | | | | | | | | |
| | Magenta | 32.6 | 32.6 | 32.6 | 32.6 | 32.6 | 32.6 | 32.6 | 32.6 | 32.6 |
| | Spinel black | | | | | | | | | |
| | Zircon yellow | | | | | | | | | |
| | Zircon vanadium | | | | | | | | | |
| Dispersing agent | BYK2013 (mass %) | 18.6 | 18.6 | 18.6 | 18.6 | 18.6 | 18.6 | 18.6 | 18.6 | 18.6 |
| Photopolymerization initiator | IQ907 (mass %) | 2.3 | 2.3 | 2.3 | 2.3 | 2.3 | 2.3 | 2.3 | 2.3 | 2.3 |
| Monofunctional monomer proportion (mass %) | | 20 | 50 | 75 | 50 | 20 | 75 | 75 | 92 | 100 |
| NVC/monomer component content ratio | | 0.00 | 0.11 | 0.11 | 0.11 | 0.11 | 0.11 | 0.11 | 0.11 | 0.11 |
| Volume ratio of inorganic solids (mass %) | | 16.2 | 16.2 | 16.2 | 16.2 | 16.2 | 16.2 | 16.2 | 16.2 | 16.2 |

TABLE 1-continued

| Glass/inorganic solids | | 0.95≤ | 0.95≤ | 0.95≤ | 0.95≤ | 0.95≤ | 0.95≤ | 0.95≤ | 0.95≤ | 0.95≤ |
|---|---|---|---|---|---|---|---|---|---|---|
| Evaluations | Image peeling | Bad | Bad | Bad | Bad | Bad | Bad | Bad | Very good | Very good |
| | Gloss | Bad | Bad | Bad | Bad | Bad | Bad | Bad | Very good | Very good |
| | Adhesive properties | Bad | Bad | Bad | Bad | Bad | Bad | Bad | Very good | Very good |

| | | | Example 10 | Example 11 | Example 12 | Example 13 | Example 14 | Example 15 |
|---|---|---|---|---|---|---|---|---|
| Photocurable monomer component (mass %) | IBXA (monofunctional) | | | | | | | |
| | BZA (monofunctional) | | | | | | | |
| | CTFA (monofunctional) | | | | | | | |
| | PHEA (monofunctional) | | 45.3 | 37.7 | 34.9 | 29.1 | 26.7 | 23.3 |
| | NDDA (difunctional) | | | | | | | |
| | TMP3A (trifunctional) | | | | | | | |
| N-vinyl compound | NVC (mass %) | | 1.2 | 2.6 | 11.6 | 17.4 | 19.8 | 23.3 |
| Inorganic solids (mass %) | Glass A | | | | | | | |
| | Magenta | | 32.6 | 36.4 | 32.6 | 32.6 | 32.6 | 32.6 |
| | Spinel black | | | | | | | |
| | Zircon yellow | | | | | | | |
| | Zircon vanadium | | | | | | | |
| Dispersing agent | BYK2013 (mass %) | | 18.6 | 20.8 | 18.6 | 18.6 | 18.6 | 18.6 |
| Photo-polymerization initiator | IQ907 (mass %) | | 2.3 | 2.6 | 2.3 | 2.3 | 2.3 | 2.3 |
| Monofunctional monomer proportion (mass %) | | | 100 | 100 | 100 | 100 | 100 | 100 |
| NVC/monomer component content ratio | | | 0.03 | 0.07 | 0.33 | 0.60 | 0.74 | 1.00 |
| Volume ratio of inorganic solids (mass %) | | | 16.2 | 18.6 | 16.2 | 16.2 | 16.2 | 16.2 |
| Glass/inorganic solids | | | 0.95≤ | 0.95≤ | 0.95≤ | 0.95≤ | 0.95≤ | 0.95≤ |
| Evaluations | Image peeling | | Bad | Very good | Very good | Very good | Very good | Bad |
| | Gloss | | Bad | Very good | Very good | Very good | Very good | Bad |
| | Adhesive properties | | Bad | Very good | Very good | Very good | Very good | Bad |

TABLE 2

| | | Example 16 | Example 17 | Example 18 | Example 19 | Example 20 | Example 21 | Example 22 | Example 23 | Example 24 | Example 25 | Example 26 | Example 27 |
|---|---|---|---|---|---|---|---|---|---|---|---|---|---|
| Photocurable monomer component (mass %) | IBXA (monofunctional) | | | | | | | | | | | | |
| | BZA (monofunctional) | 23.6 | 19.9 | 16.8 | 19.2 | 19.3 | 19.2 | 12.9 | 12.9 | 12.5 | 12.5 | 11.7 | 11.7 |
| | CTFA (monofunctional) | | | | | | | 14.0 | 14.0 | 13.6 | 13.6 | 12.8 | 12.8 |
| | PHEA (monofunctional) | 26.1 | 22.0 | 18.6 | 21.2 | 21.3 | 21.2 | 14.1 | 14.1 | 13.8 | 13.8 | 12.9 | 12.9 |
| | NDDA (difunctional) | | | | | | | | | | | | |
| | TMP3A (trifunctional) | | | | | | | | | | | | |
| N-vinyl compound | NVC (mass %) | 9.2 | 7.8 | 6.6 | 7.5 | 7.5 | 7.5 | 8.4 | 8.4 | 8.2 | 8.2 | 7.7 | 7.7 |
| Inorganic solids (mass %) | Glass A | 11.7 | 19.8 | 25.1 | 21.4 | 23.9 | 11.7 | 17.9 | 17.9 | 8.2 | 8.2 | | |
| | Magenta | | | | | | | | | | | | |
| | Spinel black | 9.7 | 13.8 | 18.8 | 9.3 | 6.5 | 19.0 | | | | | | |
| | Zircon yellow | | | | | | | 14.3 | | 25.9 | | 38.3 | |
| | Zircon vanadium | | | | | | | | 14.3 | | 25.9 | | 38.3 |

TABLE 2-continued

|  |  | Example 16 | Example 17 | Example 18 | Example 19 | Example 20 | Example 21 | Example 22 | Example 23 | Example 24 | Example 25 | Example 26 | Example 27 |
|---|---|---|---|---|---|---|---|---|---|---|---|---|---|
| Dispersing agent | BYK2013 (mass %) | 16.1 | 13.6 | 11.5 | 15.5 | 15.6 | 15.5 | 15.4 | 15.4 | 15.0 | 15.0 | 14.0 | 14.0 |
| Photo-polymerization initiator | IQ907 (mass %) | 3.7 | 3.1 | 2.6 | 6.0 | 6.0 | 6.0 | 2.9 | 2.9 | 2.9 | 2.9 | 2.7 | 2.7 |
| Monofunctional monomer proportion (mass %) | | 100 | 100 | 100 | 100 | 100 | 100 | 100 | 100 | 100 | 100 | 100 | 100 |
| NVC/monomer component content ratio | | 0.19 | 0.19 | 0.19 | 0.19 | 0.19 | 0.19 | 0.20 | 0.20 | 0.20 | 0.20 | 0.20 | 0.20 |
| Volume ratio of inorganic solids (mass %) | | 8.6 | 15.0 | 21.4 | 13.9 | 15.5 | 13.9 | 13.1 | 13.1 | 11.7 | 11.7 | 11.7 | 11.7 |
| Glass/inorganic solids | | 0.55 | 0.59 | 0.57 | 0.70 | 0.79 | 0.38 | 0.56 | 0.56 | 0.24 | 0.24 | 0.00 | 0.00 |
| Evaluations | Image peeling | Bad | Very good | Printing unavailable | Very good | Very good | Very good | Very good | Very good | Very good | Very good | Very good | Very good |
|  | Gloss | Bad | Very good | — | Very good | Very good | Good | Very good | Very good | Good | Good | Bad | Bad |
|  | Adhesive properties | Bad | Very good | — | Very good | Very good | Good | Very good | Very good | Good | Good | Not bad | Not bad |

As shown in Table 1 and Table 2, image collapse following firing was not observed and good results in terms of image peeling were achieved in Examples 8, 9, 11 to 14, 17 and 19 to 27, in which the proportion of monofunctional monomers in the photocurable monomer was at least 90 mass %, the volume ratio of inorganic solids relative to the total volume of the inkjet ink was 10 vol % to 20 vol %, and the ratio (N-vinyl compound/monomer component) of the content of an N-vinyl compound and that of the monomer component in the inkjet ink was 0.05 to 0.8 in terms of mass. From these results, it could be confirmed that by making the proportion of monofunctional monomers in the photocurable monomer at least 90 mass %, making the volume ratio of inorganic solids relative to the total volume of the inkjet ink 10 vol % to 20 vol %, and making the ratio (N-vinyl compound/monomer component) of the content of an N-vinyl compound and that of the monomer component in the inkjet ink 0.05 to 0.8 in terms of mass, it is possible to prevent peeling of a printed layer (decorative part) following firing and better fix a desired image on a ceramic substrate. Moreover, Examples 8, 9, 11 to 14, 17 and 19 to 25, in which the proportion of glass in the inorganic solids was at least 20 mass %, achieved better results in terms of gloss value and adhesive properties than Examples 26 and 27. In addition, Examples 8, 9, 11 to 14, 17, 19, 20, 22 and 23, in which the proportion of glass in the inorganic solids was at least 50 mass %, achieved even better results in terms of gloss value and adhesive properties than Examples 21, 24 and 25.

Specific examples of the present invention have been explained in detail above, but these are merely examples, and do not limit the scope of the claims. The features described in the claims can include aspects obtained by variously modifying or altering the specific examples shown above.

INDUSTRIAL APPLICABILITY

The present invention can provide an inkjet ink for a ceramic substrate, the inkjet ink making it possible to prevent a printed layer from peeling away after firing and allowing a desired image to be better fixed on a ceramic substrate.

The invention claimed is:

1. An inkjet ink used for a ceramic substrate to be fired, the inkjet ink comprising:
    an inorganic solid including an inorganic pigment and a glass;
    a photocurable monomer component; and
    an N-vinyl compound containing a nitrogen atom;
    wherein:
        the monomer component includes a monofunctional monomer having one functional group in a molecule thereof,
        a proportion of the monofunctional monomer in the monomer component is at least 90 mass %,
        a volume ratio of the inorganic solid relative to a total volume of the inkjet ink is 10 vol % to 20 vol %, and
        a ratio of a content of the N-vinyl compound to that of the monomer component (N-vinyl compound/monomer component) in the inkjet ink is 0.05 to 0.6 in terms of mass.

2. The inkjet ink according to claim 1, wherein a proportion of the glass in the inorganic solid is at least 20 mass %.

3. The inkjet ink according to claim 1, wherein a proportion of the glass in the inorganic solid is at least 50 mass %.

4. The inkjet ink according to claim 1, wherein the functional group in the monofunctional monomer is a (meth) acryloyl group.

5. The inkjet ink according to claim 1, wherein the monofunctional monomer has a molecular weight of 100 to 300.

6. A method of producing a ceramic product comprising a decorative part, the method comprising:
    depositing a cured product of the inkjet ink according to claim 1 on a surface of a ceramic substrate, and
    firing the deposited cured product under a condition whereby a maximum firing temperature is set to fall within a range of 500° C. to 1200° C.

7. The inkjet ink according to claim 2, wherein the proportion of the glass in the inorganic solid is at least 50 mass %.

8. The inkjet ink according to claim 2, wherein the functional group in the monofunctional monomer is a (meth) acryloyl group.

9. The inkjet ink according to claim 3, wherein the functional group in the monofunctional monomer is a (meth) acryloyl group.

10. The inkjet ink according to claim 2, wherein the monofunctional monomer has a molecular weight of 100 to 300.

11. The inkjet ink according to claim 3, wherein the monofunctional monomer has a molecular weight of 100 to 300.

12. The inkjet ink according to claim 4, wherein the monofunctional monomer has a molecular weight of 100 to 300.

13. A method of producing a ceramic product comprising a decorative part, the method comprising:
- depositing a cured product of the inkjet ink according to claim 2 on a surface of a ceramic substrate, and
- firing the deposited cured product under a condition whereby a maximum firing temperature is set to fall within a range of 500° C. to 1200° C.

14. A method of producing a ceramic product comprising a decorative part, the method comprising:
- depositing a cured product of the inkjet ink according to claim 3 on a surface of a ceramic substrate, and
- firing the deposited cured product under a condition whereby a maximum firing temperature is set to fall within a range of 500° C. to 1200° C.

15. A method of producing a ceramic product comprising a decorative part, the method comprising:
- depositing a cured product of the inkjet ink according to claim 4 on a surface of a ceramic substrate, and
- firing the deposited cured product under a condition whereby a maximum firing temperature is set to fall within a range of 500° C. to 1200° C.

16. A method of producing a ceramic product comprising a decorative part, the method comprising:
- depositing a cured product of the inkjet ink according to claim 5 on a surface of a ceramic substrate, and
- firing the deposited cured product under a condition whereby a maximum firing temperature is set to fall within a range of 500° C. to 1200° C.

17. The inkjet ink according to claim 1, wherein the inorganic pigment is metal nanoparticles, each of the metal nanoparticles having a $D_{50}$ particle diameter of 5 nm or more and 80 nm or less, the metal nanoparticles dispersed in the glass.

* * * * *